United States Patent [19]

Kulig

[11] B 3,995,167

[45] Nov. 30, 1976

[54] FIBEROPTIC FLUID LEVEL SENSING MECHANISM

[75] Inventor: Frank M. Kulig, Bloomfield, Conn.

[73] Assignee: The J. M. Ney Company, Bloomfield, Conn.

[22] Filed: Sept. 19, 1974

[21] Appl. No.: 507,396

[44] Published under the second Trial Voluntary Protest Program on February 10, 1976 as document No. B 507,396.

[52] U.S. Cl. .................................. 250/577; 222/65; 250/227
[51] Int. Cl.² ........................................ G01N 21/26
[58] Field of Search .......... 250/577, 227; 350/96 R, 350/96 B; 221/9, 10; 222/63, 64, 65, 66

[56] References Cited
UNITED STATES PATENTS

| | | | |
|---|---|---|---|
| 3,068,739 | 12/1962 | Hicks et al. | 250/227 |
| 3,384,885 | 5/1968 | Forbush | 250/227 |
| 3,458,705 | 7/1969 | Elmore | 250/227 |
| 3,518,437 | 6/1970 | Riggs | 250/227 |
| 3,553,666 | 1/1971 | Melone | 250/577 |
| 3,619,068 | 11/1971 | Broerman | 350/96 B |
| 3,683,196 | 8/1972 | Obenhaus | 350/96 R |
| 3,702,625 | 11/1972 | Schmidt | 250/577 |

*Primary Examiner*—Archie R. Borchelt
*Assistant Examiner*—D. C. Nelms

[57] ABSTRACT

A fiberoptic fluid level sensing mechanism is provided which is operable for performing fluid level sensing as applied particularly to a mixing and dispensing device. The mechanism embodies light projecting means supported in the device so as to be positionable in juxtaposed relation to an external light source and operable to project the light rays received from the light source towards the exposed end of the fiberoptic rod. Photoelectric means is supported in juxtaposed relation to the opposite end of the shaft, and more particularly the other end of the fiberoptic bundle. In accord with the mode of operation of the mechanism, light rays from the external light source are projected through the light projecting means into the interior of the mixing chamber wherein they are operable to light the latter. As the opaque material in the chamber is dispensed, the level thereof decreases until the exposed end of the fiberoptic bundle is rendered visible. Thereupon, the light rays being projected into the mixing chamber strike the exposed end of the fiberoptic bundle and are transmitted thereby the length of the bundle whereupon they are received by the photoelectric means wherein they are operable to activate the latter to cause a control function to be initiated thereby such as for example, stopping further operation of the device until the supply of dispensible material in the mixing chamber has been replenished.

10 Claims, 6 Drawing Figures

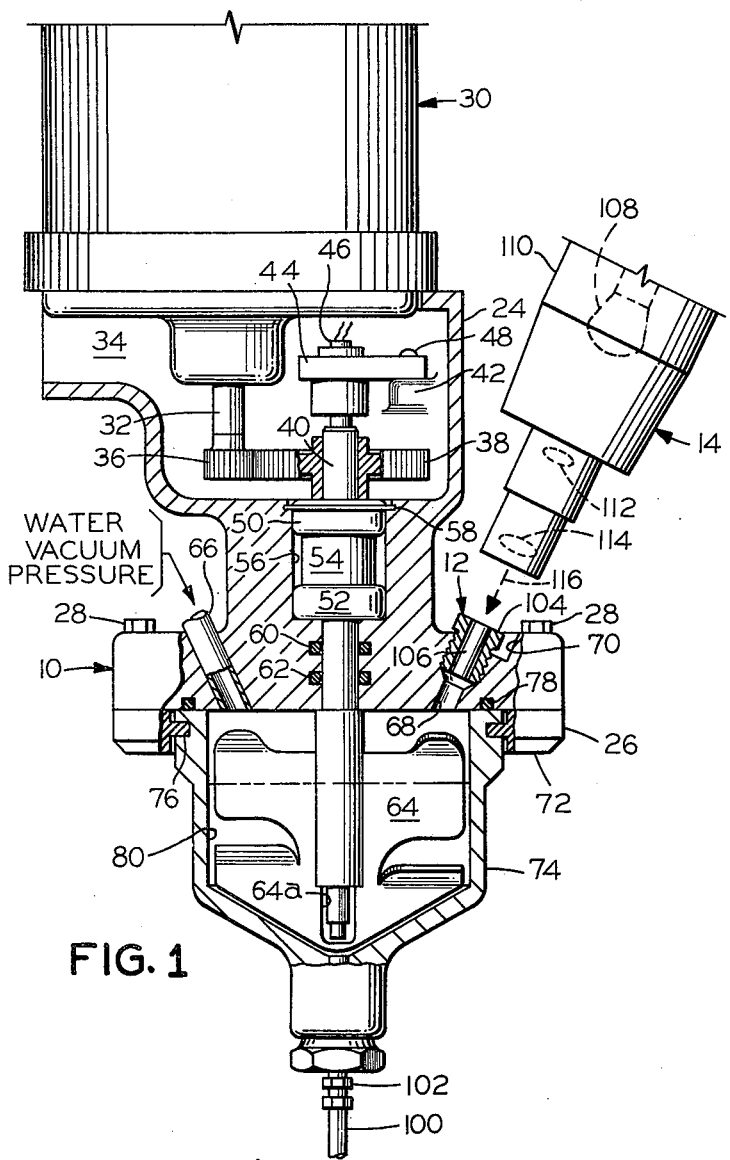
FIG. 1
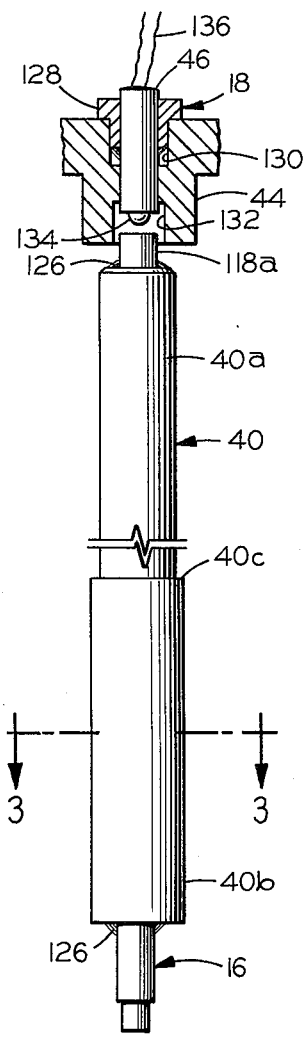
FIG. 2
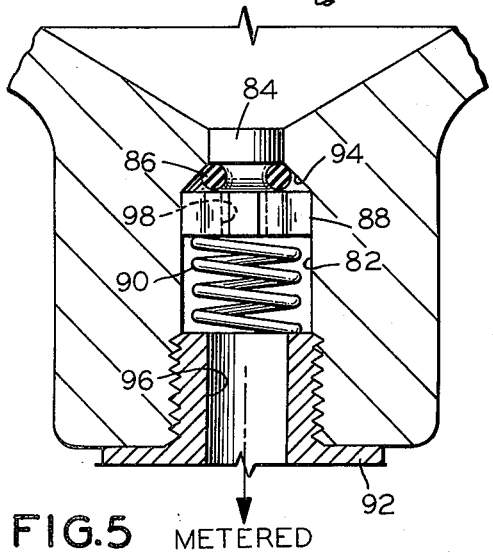
FIG. 5
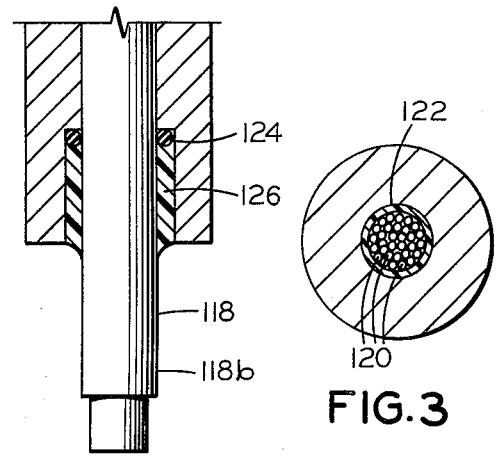
FIG. 4
FIG. 3

FIBEROPTIC FLUID LEVEL SENSING MECHANISM

BACKGROUND OF THE INVENTION

From even a cursory examination of the available prior art, it is readily apparent that it has long been known to provide devices operable for sensing the level of fluid in a confined chamber. There are many reasons why it is desirable to be able to sense the level of fluid. For example, in some instances it is desirable to ascertain what the level of fluid is in order to prevent an overfilling of the confined chamber, i.e., container with fluid. Other times, it is desired to maintain essentially a constant level of fluid in a chamber. Finally, there are some applications wherein it is desired to provide a fluid level sensing means which is operable to ensure that the level of the fluid does not fall below a predetermined level. A reference to the prior art further reveals that a proliferation of different types of fluid level sensing devices have been provided heretofore. One method of categorizing these prior art forms of fluid level sensing devices is according to the manner in which the sensing is accomplished, namely, mechanically, electrically, etc. More recently, with the advent of the development of new technologies, some efforts have been made to attempt to adopt these technologies for use in devices capable of performing fluid level sensing. By way of illustration of the latter, attempts have been made to combine optics with light producing means to provide a light-sensitive device operable for sensing the level of fluid in a chamber by means of light.

With further reference to the latter type of device, a number of different forms thereof are known in the prior art. This is exemplified by the following illustrations. For example, in U.S. Pat. No. 2,984,148 there is disclosed a measuring apparatus which operates to determine the level of fluid in a chamber by measuring the amount of light energy that is absorbed as light is passed through a tubular column which is positioned in the chamber. A liquid level indicator utilizing fiberoptics and prisms forms the subject matter of U.S. Pat. No. 3,120,125. In accordance with the teachings of the latter patent, when the base surface of the prism is exposed to the air, the light rays are reflected into the sensing fiberoptics to indicate the fluid level. U.S. Pat. No. 3,192,392 shows a third type of light-sensitive fluid level sensing detector wherein a rod is provided which is capable of carrying light rays disposed within the container. The aforesaid rod has a series of notches or grooves about its circumference so that light rays will pass when the liquid level is high enough to avoid an air interface and will be reflected from the air interface when the liquid level drops therebelow. These reflected rays are sensed by a photoelectric probe located adjacent the calibrated grooves. In U.S. Pat. No. 3,384,885 there is depicted a multiple liquid reservoir level indicator which employs the end of a fiberoptic tube as a prism whereby if the liquid level in any reservoir is sufficiently low the light is reflected back through the tube in that reservoir and into another branch of the optical fiber circuit to visual indicator means. The final form of light-sensing device which will be referenced herein by way of illustration is that which forms the subject matter of U.S. Pat. No. 3,458,705. The latter patent is directed to a flow control apparatus wherein there is employed a central tube which acts as the light conductor and which has a prism surface at the end disposed adjacent to the sensing photoelectric cell.

The light-sensing means operable as fluid level sensor devices which have been referred to in the preceding paragraph are intended to merely exemplify some of the various forms thereof which have been provided heretodate by the prior art. Notwithstanding the fact that such a wide variety of such devices have been known heretofore, the performance of the latter when placed in actual use has not proven to be entirely satisfactory. More specifically, it has been shown that a need exists to provide a fluid level sensing mechanism which is capable of being employed in a system wherein a slurry has been mechanically spatulated under vacuum and a controlled dispensing of this slurry takes place under air pressure. The employment in such a system of a fluid level sensing mechanism is necessary because the escape of compressed air through the metering tube after the supply of slurry has been exhausted would produce a disastrous effect. Namely, the high velocity of compressed air would, in the event the slurry was being dispensed into cylindrical ring open at one end and containing one or more fragile wax patterns, which is a common form of application in which such a system is utilized, deform or destroy the latter, incorporate air bubbles in the slurry and cause excessive splashing thereof. Moreover, a need has existed to provide such a fluid level sensing mechanism which in addition is compatible with a system wherein a mixing paddle or agitator is used. whereby the fluid level sensing function can still be performed notwithstanding the fact that a member is being rotated through the chamber within which the fluid whose level is to be sensed is located.

Accordingly, it is an object of the present invention to provide a novel and improved fluid level sensing mechanism which is capable of being employed in conjunction with a variety of different types of process equipment utilized for dispensing or otherwise processing various fluids including liquids, slurries and powders for purposes of performing a fluid level sensing function.

It is another object of the present invention to provide such a fluid level sensing mechanism wherein light sensing means are utilized for purposes of sensing the level of the fluid.

A further object of the present invention is to provide such a fluid level sensing mechanism wherein the light-sensing means thereof includes a fiberoptic bundle which cooperates with an external light source and photoelectric means to indicate fluid level within a confined chamber.

A still further object of the present invention is to provide such a fluid level sensing mechanism which is particularly suited for use in a system wherein a slurry has been mechanically spatulated under vacuum and a controlled dispensing of this slurry takes place under air pressure.

Yet another object of the present invention is to provide such a fluid level sensing mechanism which is compatible for use in a system wherein a mixing paddle or agitator is used in that the fluid level sensing function is capable of being performed notwithstanding the fact that a member is being moved within the chamber in which the fluid whose level is to be sensed is located.

Yet still another object of the present invention is to provide such a fluid level sensing mechanism which is capable of accurately performing the fluid level sensing function, yet is relatively easy to employ.

SUMMARY OF THE INVENTION

It has now been found that the foregoing and related objects can be readily attained in a fiberoptic fluid level sensing mechanism which is operable for performing fluid level sensing as applied particularly to a mixing and dispensing device, but which is also capable of being employed in conjunction with various other types of process equipment utilized for dispensing or otherwise processing various fluids including liquids, slurries and powders. The mechanism is embodied in a device which includes a housing having a mixing chamber provided therein for receiving material to be dispensed from the device in the form of a metered flow. Within the housing there is suitably supported a motor which is operatively connected to a shaft by means of gear means whereby the shaft is rotatably driven from the motor. The shaft has one end thereof which extends into the mixing chamber and which has a paddle affixed thereto for rotation therewith. A fiberoptic bundle is supported within the shaft so that at least one end thereof extends outwardly of the end of the shaft which is positioned within the mixing chamber so as to be exposed to the receipt thereby of light rays. The mechanism embodies light projecting means supported in the device so as to be positionable in juxtaposed relation to an external light source and operable to project the light rays received from the light source towards the exposed end of the fiberoptic bundle. Photoelectric means is supported in juxtaposed relation to the opposite end of the shaft, and more particularly the other end of the fiberoptic bundle. In accord with the mode of operation of the mechanism, light rays from the external light source are projected through the light projecting means into the interior of the mixing chamber wherein they are operable to light the latter. As the opaque material in the chamber is dispensed, the level thereof decreases until the exposed end of the fiberoptic bundle is rendered visible. Thereupon, the light rays being projected into the mixing chamber strike the exposed end of the fiberoptic bundle and are transmitted thereby the length of the rod whereupon they are received by the photoelectric means wherein they are operable to activate the latter to cause a control function to be initiated thereby such as for example, stopping further operation of the device until the supply of dispensible material in the mixing chamber has been replenished.

In accord with the preferred embodiment of the invention, the mechanism is embodied in a device which includes a housing that is of two-part construction. The motor and the gear means of the device are mounted in one portion of the housing. The mixing chamber is provided in the other portion of the housing, while the shaft has one end thereof which is located within one portion with the other end thereof being located within the other portion of the housing. A multipurpose inlet is formed in the housing extending from the exterior of the housing to the interior of the mixing chamber so as to provide communication therebetween for purposes of providing the mixing chamber with different substances. The light projecting means comprises a lens plug including an acrylic window which is supported in a passage formed within the housing so as to provide communication between the exterior of the housing and the interior of the mixing chamber so as to permit light rays from an external light source to be received in the chamber. The lens plug is supported at an angle to the major axis of the device whereby the major axis of the lens plug and the major axis of the shaft converge towards a point whereat there is to be found located the exposed end of the fiberoptic bundle. The latter bundle preferably consists of a multiplicity of fiberoptic elements arranged all with their major axes lying substantially parallel to each other. The photoelectric means comprises a photoelectric receiver which is located in slightly spaced relation to the end of the fiberoptic bundle which is opposite to the end thereof that is struck by the light rays being projecting into the interior of the mixing chamber through the lens plug. The photoelectric receiver is connected in electrical circuit relation preferably with a control relay of conventional construction. The latter relay in turn may be connected in electrical circuit relation with any of the various operating components of the device such as the motor, valve means for causing material to be supplied through the multipurpose inlet to the interior of the mixing chamber, etc. whereby when light rays which are transmitted the length of the fiberoptic bundle are received by the photoelectric receiver, the latter functions to effect operation of the relay connected in circuit relation therewith thereby in turn causing the initiation of some function to be performed effecting the operation of the device.

BRIEF DESCRIPTION OF THE DRAWINGS

FIG. 1 is a side elevational view partially in section of a mixing and dispensing device embodying a fiberoptic fluid level sensing mechanism constructed in accordance with the present invention;

FIG. 2 is a side elevational view partially in section on an enlarged scale of the light transmitting means and the photoelectric means of a fiberoptic fluid level sensing mechanism constructed in accordance with the present invention;

FIG. 3 is a cross sectional view of the light transmitting means of a fiberoptic fluid level sensing mechanism constructed in accordance with the present invention taken substantially along the line 3—3 in FIG. 2;

FIG. 4 is a side elevational view partially in section on an enlarged scale of a portion of the light transmitting means of a fiberoptic fluid level sensing mechanism constructed in accordance with the present invention, illustrating the manner of assembly thereof;

FIG. 5 is a side elevational view partially in section of the dispensing portion of a mixing and dispensing device embodying a fiberoptic fluid level sensing mechanism constructed in accordance with the present invention.

DETAILED DESCRIPTION OF THE ILLUSTRATED EMBODIMENT

Figure 6:
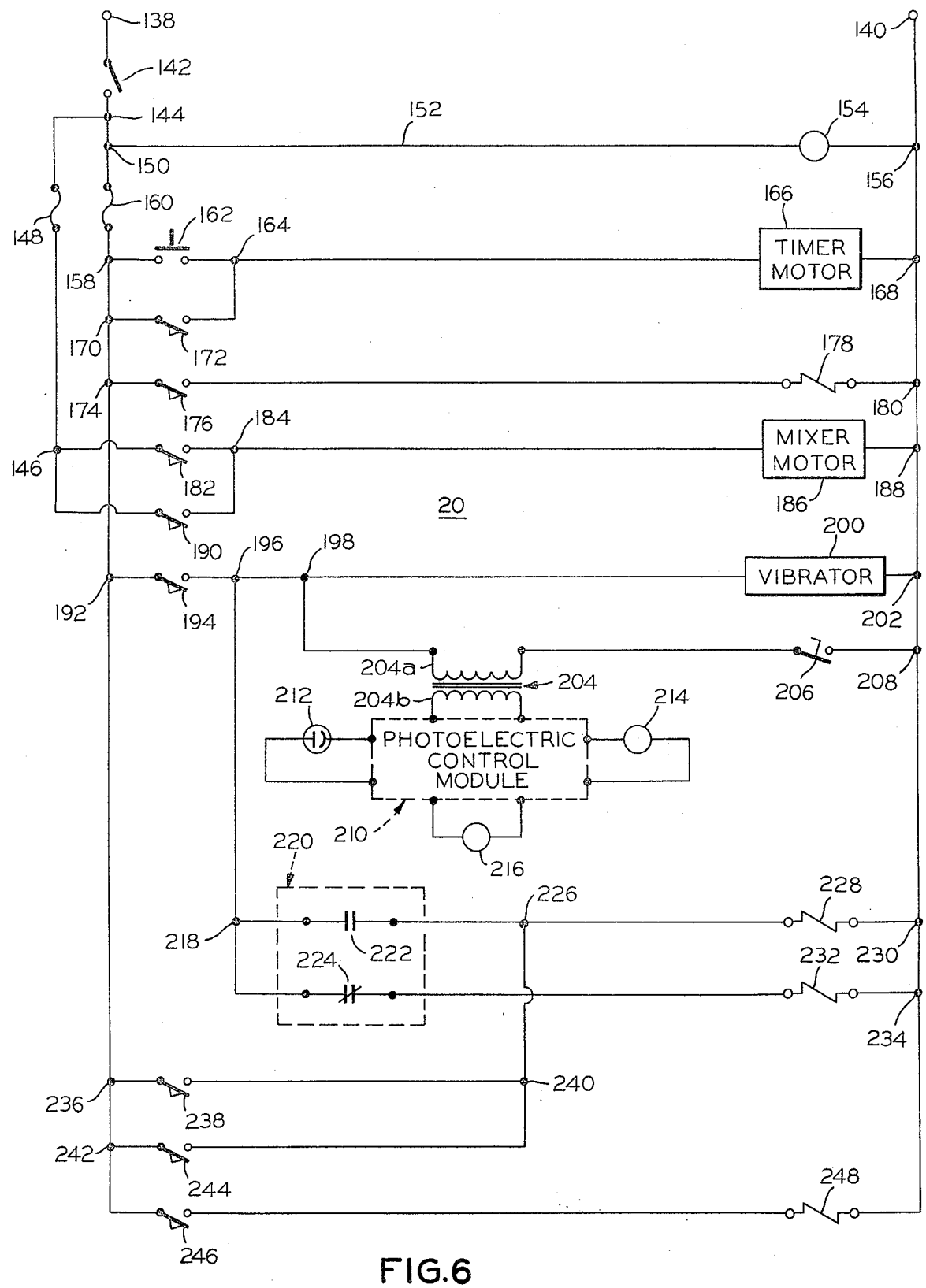
FIG. 6 is a schematic diagram of the electrical circuitry of a mixing, dispensing and self-cleaning device embodying a fiberoptic fluid level sensing mechanism constructed in accordance with the present invention.

Referring now to the drawings, and more specifically FIG. 1 thereof, there is depicted therein a mixing and dispensing device, generally designated by the reference numeral 10, embodying a fiberoptic fluid level sensing mechanism constructed in accordance with the present invention. The fiberoptic fluid level sensing mechanism includes a light projecting means 12 operable for projecting the light rays produced by an external light source 14 into the device 10, light transmitting means 16, photoelectric means 18 operable for receiving light rays transmitted thereto by the light transmitting means 16 and electrical circuitry 20, schematically depicted in FIG. 6 of the drawings, operable for connecting the photoelectric means 18 in electrical circuit relation with the operating components of the device 10.

With regard to the nature of the construction of the device 10, it is to be understood that although one particular form thereof has been selected for illustration in the drawings that the invention is not limited in its applicability thereto but rather is capable of being employed in conjunction with various other types of process equipment utilized for dispensing or otherwise processing various fluids including liquids, slurries or powders. The mixing and dispensing device 10 in accord with the illustrated embodiment thereof includes a housing 22 of multipart construction. More specifically, the housing 22 includes an upper portion 24 and a lower portion 26, as viewed with reference to FIG. 1 of the drawings. The upper portion 24 and the lower portion 26 may be fastened together through the use of any suitable conventional form of fastening means commonly found employed for fastening two members together. In this regard, the upper housing portion 24 and the lower housing portion 26 have been depicted in FIG. 1 as being fastened together through the use of a plurality of threaded fasteners 28, the latter being received in suitable openings (not shown) formed for this purpose in the portions 24 and 26. It is to be understood that the openings (not shown) provided in the lower housing portion 26 are preferably threaded so as to enable the fasteners 28 to be threadedly engaged therewithin for purposes of ensuring that the portions 24 and 26 are secured tightly together.

As best understood with reference to FIG. 1 of the drawings, the upper housing portion 24 functions as a support for the motor 30. The latter, which is of conventional construction and is operable for a purpose yet to be described, is supported on the upper housing portion 24 so that the drive shaft 32 thereof extends downwardly as viewed with reference to FIG. 1 and substantially parallel to the major axis of the device 10. Although not depicted in the drawings in the interest of maintaining clarity of illustration therein, it is to be understood that any conventional form of mounting means may be employed for purposes of mounting the motor 30 in supported relation relative to the upper housing portion 24. As depicted in FIG. 1 of the drawings, the upper housing portion 24 is provided with a chamber 34 within which the shaft 32 is located. On the outer end of the shaft 32 there is suitably affixed a pinion 36, such as for example, by means of a pin connection (not shown), whereby the pinion 36 rotates with the shaft 32. The latter pinion 36 is suitably positioned so as to be engageable with a larger gear 38 which is affixed through the use of any conventional form of securing means to one end 40a of a shaft 40, to which further reference will be made hereinafter.

The photoelectric means 18, which has been referred to herein previously, is also located within the chamber 34. To this end, in accord with the illustrated embodiment of the device 10, the latter is provided with a suitably configured boss 42 which is preferably formed integrally on the side wall of the chamber 34. A suitable holder 44, which will be described more fully hereinafter, in which the photoelectric receiver 46 is supported is secured to the boss 42 by means of a conventional fastener 48. Moreover, as shown in FIG. 1 of the drawings, the photoelectric means 18 when so mounted within the chamber 34 is located in juxtaposed relation to the end 40a of the shaft 40.

With further reference to the shaft 40, the latter is supported within a through passage (not shown) provided for this purpose in the upper housing portion 24. More specifically, the shaft 40 adjacent the end 40a thereof is supported in a pair of bearings 50 and 52 of conventional construction. The latter bearings 50 and 52 are separated by means of a spacer 54. Moreover, the bearings 50 and 52 as well as the spacer 54 are positioned within a cavity 56 formed for this purpose in the upper housing portion 24. In accord with the illustrated embodiment of the device 10, a retaining ring 58 is preferably positioned in a groove (not shown) provided for this purpose in the upper housing portion 24 in slightly spaced relation to the bottom, as viewed with reference to FIG. 1, of the chamber 34. The retaining ring 58 is operable to maintain the bearings 50 and 52, and the spacer 54 positioned within the cavity 56. Intermediate the ends 40a and 40b of the shaft 40, there are preferably provided a pair of sealing members, namely, O-rings 60 and 62 which are received in openings provided therefor in the upper housing portion 24 adjacent to the cavity 56. The shaft 40 is passed through the O-rings 60 and 62 whereby to provide a seal between the shaft 40 and the upper housing portion 24.

Continuing with the description of the nature of the construction of the shaft 40, the latter at approximately the midpoint thereof is provided with a shoulder 40c resulting from the fact, as best understood with reference to FIG. 2 of the drawings, that the lower portion, ,i.e., the portion encompassing the end 40b of the shaft 40 is of greater diameter than the upper portion thereof, i.e., the portion encompassing the end 40a. In accord with the illustrated embodiment of the device 10, the shaft 40 preferably has mounted thereon a mixing paddle or agitator 64 adjacent the end 40b thereof for rotation therewith. Any known means commonly found employed for purposes of securing a member on a shaft may be utilized for purposes of affixing the paddle 64 to the shaft 40.

Completing the description of the nature of the construction of the upper shousing portion 24, the latter has mounted therein one end of a portion of a conduit 66. The conduit 66 is received in a suitably located through passage formed in the upper housing portion 24 and is operable to provide a means of communication between the exterior of the device 10 and the interior of the lower housing portion 26. More specifically, the conduit 66 is intended to be utilized for purposes of supplying materials as desired to the interior of the device 10, to which further reference will be made subsequently. The upper housing portion 24 is further provided with another through passage 68 which also serves to provide a means of communication between the exterior of the device 10 and the interior of the lower housing portion 26. There is mounted within the passage 68, the light projecting means 12, the nature of the construction of which will be later described hereinafter. At this point, it is deemed sufficient merely to note that the outer end of the passage 68 in accord with the illustrated embodiment of the device 10, is countersunk, the latter being designated in FIG. 1 through the use of the reference numeral 70. Moreover, it is to be noted that as depicted in FIG. 1 of the drawings the light projecting means 12 is preferably mounted in the passage 68 by virtue of the threaded engagement between the threads provided on the light projecting means 12 and the threads with which the outer end of the passage 68 is provided.

Turning now to a consideration of the lower housing portion 26, the latter in accord with the illustrated embodiment thereof is of multipart construction. More specifically, the lower housing portion 26 consists of a support member or holder 72 and a container 74. Although a variety of different methods may be employed for purposes of assembling together the support member 72 and the container 74, preferably this is accomplished by means of a dovetail construction wherein the support member 72 is provided on its inner surface with the tenon 76 which in turn is received in a mortise provided therefor in the outer wall of the container 74. As illustrated in FIG. 1 of the drawings, the mortise is suitably located in the container 74 so that when the container 74 and the support member 72 are assembled together to form the unit which comprises the lower housing portion 26 and the latter is in turn fastened to the upper housing portion 24 the rim of the container 74 is positioned flush with the bottom surface of the upper housing portion 24. To provide a seal between the upper housing portion 24 and the rim of the container 74, there is preferably interposed therebetween a suitable conventional sealing gasket, which in the drawings has been depicted as taking the form of an O-ring 78. The latter O-ring 78 is received within a groove provided therefor in the bottom surface of the upper housing portion 24.

Continuing with the description of the lower housing portion 26, when the latter is fastened to the upper housing portion 24 the interior 80 of the container 74 functions as a mixing chamber within which the end 40b of the shaft 40 to which the paddle 64 is affixed is received. In accord with the method of employment of the device 10 to which further reference will be had hereinafter, material is supplied from an external source thereof through the previously described conduit 66 into the mixing chamber, i.e., the interior 80 of the container 74. The presence of such material in the mixing chamber 80 has been schematically depicted in the drawings by means of the broken line which appears in FIG. 1.

For purposes of enabling material to be dispensed from the mixing chamber 80 of the device 10, the container 74 embodies an outlet 82 formed at the bottom thereof, as viewed with reference to FIG. 1 of the drawings. In order to control the rate at which material is dispensed from the mixing chamber 80, regulating means operable for providing a metered flow of material is cooperatively associated with the outlet 82. The aforesaid regulating means includes a solid disc 84, a gasket 86, a peripherally scalloped disc 88, a spring 90, and a threaded plug 92. As best understood with reference to FIG. 5 of the drawings, the outlet 82 with which the container 74 is provided varies in dimensions along the length thereof. Namely, the diameter of the outlet 82 at the outer end thereof is greater than the diameter of the outlet 82 at the other end thereof which communicates with the mixing chamber 80. Moreover, intermediate the ends thereof the outlet 82 for a portion of its length, designated in FIG. 5 by means of the reference numeral 94, is tapered. Referring again to the aforementioned regulating means, the plug 92 is mounted in the outer end of the outlet 82 by means of the threaded engagement which exists between the threads of the plug 92 and those with which the outer end of the outlet 82 is provided. The plug 92 has a hollow center 96 through which the material is capable of flowing. With the plug 92 so mounted in the outlet 82, the inner end thereof functions as a seat for one end of the spring 90. The other end of the spring 90 engages one side of the disc 88. The latter has formed around the periphery thereof a plurality of scallopshaped openings 98, as depicted by broken lines in FIG. 5 of the drawings, through which material is capable of passing. The spring 90 functions to apply an upward biasing force against the disc 88. In this regard, movement of the disc 88 in an upward direction, as viewed with reference to FIG. 5 of the drawings, is limited by virtue of the engagement of the upper surface of the disc 88 with the tapered sidewall portion 94 of the outlet 82. The gasket 86 is supported on the upper portion of the disc 88 with the solid disc 84 in turn being supported on the gasket 86. More specifically, the disc 88 is preferably provided adjacent the top thereof with an arcuate groove suitably dimensioned to enable the gasket 86 to be received therewithin. The positioning of the gasket 86 in the aforereferenced groove is accomplished by stretching the gasket 86 over the end of the disc 84 and placing it in the groove whereat it is held captive. The dimensions of the gasket 86 and the disc 84 are suitably selected so that with the components which comprise the regulating means positioned as shown in FIG. 5 of the drawings, the upper surface of the disc 84 is located so as to be substantially flush with the bottom of the mixing chamber 80.

There will now be set forth a brief description of the mode of operation of the aforedescribed regulating means. To this end, the components which comprise the regulating means are movable between a first position, the latter corresponding to the position thereof depicted in FIG. 5 of the drawings, which corresponds to the non-dispensing condition of the regulating means and a second position (not shown) which corresponds to the dispensing condition thereof wherein a metered flow of material is permitted to pass through the outlet 82. More specifically, the spring 90 is selected so that under predetermined conditions the biasing force being applied thereby through the disc 88 and the gasket 86 to the disc 84 is equal to or greater than the force being applied to the upper face of the disc 84, as viewed with reference to FIG. 5, by the material present in the mixing chamber 80. As long as the spring force on the lower face of the disc 84 is greater than the hydraulic force on the upper face thereof, the disc 84 will remain positioned as shown in FIG. 5 of the drawings, thereby effectively blocking passage of material from the mixing chamber 80 into the outlet 82. Consequently, material present in the mixing chamber 80 is prevented from flowing from the mixing chamber 80 into the outlet 82 and therefrom into the conduit 100 which as illustrated in FIG. 1 of the drawings is operatively connected by means of a conventional type of fitting 102 to the outer end of the outlet 82. On the other hand, when an imbalance in the forces acting on the faces of the disc 84 occurs, namely, when the force acting on the upper face of the disc 84 exceeds by a preestablished value that being exerted by the spring 90 through the disc 88 and the gasket 86 on the lower face of the disc 84, the latter is caused to move downwardly as viewed with reference to FIG. 5 of the drawings, by virtue of the force differential existing across the faces of the disc 84. As the disc 84 moves downwardly, the gasket 86 and the disc 88 are also forced downwardly thereby causing the spring 90 to be compressed. When the disc 84 moves downwardly a sufficient extent so that it is located within the portion of the outlet 82 whereat the sidewalls 94 thereof are tapered, material is free to flow from the mixing chamber 80 into the outlet 82, around the disc 84, through the scalloped-shaped openings 98 of the disc 88 and the hollow center 96 of the plug 92 whereupon it exits from the outlet 82. It will be readily understood that when the biasing force being exerted by the spring 90 once again equals or exceeds the force being applied to the upper face of the disc 84, the spring 90 functions to cause the disc 88, the gasket 86 and the disc 84 to return to the positions thereof depicted in solid lines in FIG. 5 thereby shutting off the flow of material through the outlet 82 from the mixing chamber 80. It is to be understood that when an imbalance in the forces being applied to the faces of the disc 84 exists wherein the biasing force being applied to the lower face of the disc 84 by the spring 90 exceeds that being applied to the upper face of the disc 84, the upward movement of the disc 84 is limited because of the fact that the disc 84 rests on the gasket 86 which in turn is limited in its upward movement, as noted herein previously, by virtue of the engagement of the upper surface of the disc 88 with the tapered sidewalls 94 of the outlet 82.

A description will now be set forth of the major component parts of the fluid level sensing mechanism, namely, the light projecting means 12, the light transmitting means 16, and the photoelectric means 18 as well as the external light source 14. Considering first the light projecting means 12, the latter consists of a lens plug 104 which is provided with a through passage 106 at its center. The outer end of the passage 106 is preferably closed by means of an acrylic window (not shown). As described previously, the lens plug 104 is provided with a multiplicity of external threads which cooperate with the internal threads with which at least a portion of the passage 68 is provided whereby the lens plug 104 may be threaded into the outer end of the passage 68 and thereby retained therein.

Although a variety of different means could be employed as an external light source, by way of exemplification one particular type of external light source, designated generally in the drawings by the reference numeral 14, has been illustrated for purposes of obtaining an understanding of the present invention. It is, however, to be understood that other forms of an external light source could be employed without departing from the essence of the invention. As depicted in FIG. 1 of the drawings, the external light source 14 consists of a lamp 108 shown in broken lines therein which is suitably mounted in an enclosure, i.e., holder 110. The holder 110 in addition is provided with a pair of lenses 112 and 114 which are suitably supported therein in spaced relation relative to each other so as to be applied relative to each other. The lamp 108 of the external light source 14 produces light rays which are received by the lenses 112 and 114 and are directed therefrom, as schematically illustrated by the arrow 116 in FIG. 1 of the drawings, towards the lens plug 104. The lens plug 104 in turn functions to project the light rays received thereby to a particular location within the mixing chamber 80, i.e., so that the light rays will strike a point whereat the end 40b of the shaft 40 is located, for a purpose yet to be described.

With reference next to the light transmitting means 16, the latter comprises a fiberoptic bundle 118 which is received in supported relation within the center of the shaft 40. The bundle 118 as best understood with reference to FIG. 2 of the drawings, is of greater length than the shaft 40 whereby one end 118a of the former projects outwardly of the end 40a of the shaft 40 while the other end 118b thereof extends outwardly of the end 40b of the shaft 40. The bundle 118 as illustrated in FIG. 3 of the drawings consists of a multiplicity of fiberoptic elements 120 which are encased in an outer layer of glass cladding 122. As illustrated in FIG. 4 of the drawings, a portion of the glass cladding 122 for a purpose yet to be described is removed adjacent to the end 118b of the bundle 118 thereby exposing to view the ends of the multiplicity of fiberoptic elements 120. Although the bundle 118 is capable of being supported within the shaft 40 in a variety of different ways, in accord with the illustrated embodiment of the invention the bundle 118 is held in place within the shaft 40 and pressure sealed therewithin by means of a pair of O-rings 124, only one of which is shown in the drawings, and a potting 126 of epoxy resin. In this connection, both of the ends, i.e., end 40a and end 40b of the shaft 40 are each provided with a countersink capable of receiving therein one of the O-rings 124 and a potting 126 of epoxy resin. For purposes of assembling the bundle 118 with the shaft 40, the former is inserted into the opening (not shown) provided therefore at the center of the shaft 40. With the ends 118a and 118b of the bundle 118 projecting outwardly of the shaft 40 in the manner illustrated in FIG. 2 of the drawings, an O-ring 124 is placed on each end of the bundle 118 and is pushed along the length thereof until the O-rings 124 located at the bottom of the countersinks with which the shaft 40 is provided. With the O-rings 124 so positioned, the latter are preferably potted in place through the use of a suitable form of a conventional epoxy resin 126. As a result, the bundle 118 is held tightly in place within the shaft 40 and will move therewith when the shaft 40 is being rotated by the motor 30. It will be noted with reference to FIG. 1 of the drawings that in accord with the illustrated embodiment of the device 10, the paddle 64 which is affixed to the end 40b of the shaft 40 has cutout 64a formed therein which is suitably dimensioned so as to be capable of receiving therewithin the outwardly projecting end 118b of the bundle 118. Moreover, the cutout 64a is suitably configured so that when the end 118b of the bundle 118 is received therein, the exposed ends of the multiplicity of fiberoptic elements 120 are rendered visible from the exterior of the paddle 64.

Turning now to a description of the nature of the construction of the photoelectric means 18, the latter as was discussed previously herein, includes a photoelectric receiver 46 which is suitably supported in a holder 44, which in turn is fastened to a boss 42 by means of a fastener 48. More specifically, the photoelectric receiver 46 is supported in a plug-like member 128 which in turn is suitably secured, such as through the use of an adhesive, etc., in a cavity 130 provided for this purpose in the holder 44. The latter also has formed therein a through passage which functions to interconnect the cavity 130 with a second cavity 132 with which the holder 44 is provided. As depicted in FIG. 2 of the drawings, when the plug-like member 128 with the photoelectric receiver 46 supported therein is positioned in the cavity 130, the body of the photoelectric receiver 46 is received within the aforedescribed through passage with the light sensor portion 134 of the photoelectric receiver 46 located at one end thereof being located within the cavity 132 and with the electrical conductors 136 which are employed to connect the photoelectric receiver 46 in electrical circuit relation with the circuit means 20 extending outwardly of the other end of the photoelectric receiver 46 so as to be externally accessible. In addition, it will be noted with reference to FIG. 2 of the drawings that the cavity 132 which is formed in the holder 44 is suitably dimensioned so as to also enable the end 118a of the bundle 118 to be received therewithin with the latter being located in suitably spaced relation relative to the light sensor portion 134 of the photoelectric receiver 46.

The final portion of the device 10 which remains to be described is the electrical circuit means 20 by means of which the operation of the device 10 is controlled. Although there is schematically illustrated in FIG. 6 of the drawings, one particular embodiment of electrical circuit means 20 it is to be understood that modifications may be made thereto without departing from the essence of the invention to provide for other modes of operation of the device 10. Referring to FIG. 6 of the drawings, the electrical circuit means 20 includes a pair of terminals 138 and 140 by means of which the device 10 is connectable to an externally located electrical power supply. An ON-OFF switch 142 has one side thereof connected in circuit relation with the terminal 138 while the other side thereof is connected to the junction 144. Between junction 144 and the junction 146, a fuse 148 is preferably provided. The junction 144 is also connected to another junction 150 which in turn is connected by means of conductor 152 to one side of a pilot light 154. The other side of the pilot light 154 is connected in circuit relation through the junction 156 to the other terminal 140. Continuing with the description of the electrical circuit means 20, a second fuse 160 is connected between junction 150 and the junction 158. There is also connected to the junction 158 one side of a switch 162, which is operable for purposes of initiating the start of a cycle of operation of the device 10. The other side of the switch 162 in turn is connected through junction 164 to one side of the timer motor 166, the other side of which is connected through junction 168 to the terminal 140. A first cam-operable switch 172 is connected across the cycle switch 142. More specifically, the cam-operable switch 172 is connected across junctions 170 and 164. A second cam-operable switch 176 is connected between the junction 174, which is connected in circuit relation with the aforementioned junction 170, and one side of the solenoid operated valve 178. The other side of the solenoid operated valve 178 which is employed to control the application of a vacuum to the interior of the mixing chamber 80 through the conduit 66, is connected through junction 180 to the terminal 140. The electrical circuit means 20 embodies a third and fourth cam-operable switch 182 and 190, respectively. The switch 182 has one side thereof connected to the junction 146, and the other side connected through junction 184 to one side of the mixer motor 186 which consists of the previously described motor 30 and the electrical circuitry associated therewith. The other side of the mixer motor 186 is connected through junction 188 to the terminal 140. The switch 190 on the other hand is connected across the switch 182, namely between junctions 146 and 184. Proceeding further with the description of the electrical circuit means 20, a fifth cam-operated switch 194 has one side thereof connected to the junction 192 and therethrough to the terminal 138. The other side of the switch 194 is connected through junctions 196 and 198 to one side of a vibrator 200, the other side of which is connected through junction 202 to the other terminal 140. A transformer 204 has one side of one winding 204a thereof connected to the junction 198 and the other side of the latter winding connected to one side of a foot operated switch 206. The other side of the switch 206 is connected through junction 208 to the terminal 140. The other winding 204b of the transformer 204 is connected in circuit relation with a photoelectric control module, generally designated in FIG. 6 by the reference numeral 210. Included in the module 210, i.e., connected in electrical circuit relation therein is the photo cell 212 embodied in the photoelectric receiver 46 previously described hereinabove, the light source 214, i.e., the light producing means embodied in the lamp 108, and a control relay 216. The latter control relay 216 has operatively associated therewith a pair of contacts 222 and 224 which are depicted in FIG. 6 of the drawings located within a control module 220. More specifically, contact 222, which is schematically depicted in FIG. 6 as a normally open contact, is connected in circuit relation between the junctions 218 and 226. Junction 226 in turn has connected thereto one side of a solenoid operated valve 228, the other side of which is connected through junction 230 to the terminal 140. In accord with the mode of operation of the electrical circuit means 20, the valve 228 functions to control the application of air pressure into the mixing chamber 80. Insofar as concerns the other contact, i.e., the contact 224, the latter which is a normally closed contact is connected in electrical circuit relation between junction 218, and one side of solenoid operated valve 232, the other side of which is connected through junction 234 to the terminal 140. The function of the valve 232 is to effect pressure release within the mixing chamber 80. Completing the description of the electrical circuit means 20, the latter embodies therein three more cam-operated switches, namely, switches 238, 244 and 246. Switch 238 is connected in circuit relation between junction 236 and junction 240, the latter being connected to the previously described junction 226. Switch 244 on the other hand is connected between junctions 242 and 240. Finally, switch 246 is connected between junction 242 and one side of solenoid operated valve 248, the other side of which is connected through junction 234 to terminal 140. The valve 248 functions to control the flow of water into the mixing chamber 80.

There will now be set forth a brief description of the intended mode of operation of the mixing and dispensing device 10 embodying a fiberoptic fluid level sensing mechanism constructed in accord with the present invention, Operation of the device 10 is started by closing the ON-OFF switch 142 which functions to cause electrical power to be supplied to the device 10. In accord with the preferred method of employment of the device 10 however, the investment material is preferably first placed into the mixing chamber 80 in powder form with the proper amount of water thereafter also being added to the chamber 80. This is accomplished by disassembling the container 74 from the holder 72, the former as noted previously hereinabove being detachably mounted on the latter through the use of a suitable construction operable for this purpose. Once the investment material and the water have been placed in the chamber 80, the container 74 is thereupon reassembled with the holder 72. Thereafter, the cycle of operation is initiated. During the latter, through the use of a cam-operated switch and solenoid operated valve, a vacuum is caused to be applied to the interior of the mixing chamber 80 whereby the mechanical spatulation of the slurry which is accomplished through operation of the rotating paddle 64 occurs under a vacuum. Finally, the investment as desired is dispensed under pressure from the mixing chamber 80 in response to activation of the foot operated switch 206. The pressure employed in this connection is compressed air which is caused to be supplied to the mixing chamber 80 in the proper amount and sequence through operation of a cam-operated switch and solenoid operated valve with which the electrical circuit means 20 is provided. The air pressure is released similarly through operation of another cam-operated switch and solenoid operated valve. The effect of the application of the air pressure to the interior of the mixing chamber 80 is to increase the force being applied to the inner face of the disc 84 through the hydraulic force of the investment slurry. Consequently, the latter disc 84 is caused to move against the base of the spring 90 thereby opening the outlet 82 to passage therethrough of a metered flow of investment. Upon release of the pressure in the mixing chamber 80, the spring 90 through its biasing action causes the disc 84 to return to its closing, i.e., blocking position thereby preventing further flow of investment out of the mixing chamber 80. Inasmuch as the specific manner in which the mixing and dispensing of the investment is accomplished in the device 10 is only indirectly related to the subject matter of the present invention, it is not deemed necessary to describe herein the mode of operation of the device 10 with a greater degree of particularity than that which has been set forth above, rather, the mode of operation of the fiberoptic fluid level sensing mechanism with which the device 10 is provided will be described in detail. In this regard, the glass fiberoptic bundle 118 is mounted in the mixing shaft 40. The former is held in place and pressure sealed therein by means of O-rings 124 and a potting of epoxy resin 126. The lower end 118b of the bundle 118 has the outer glass cladding removed circumferentially therefrom for a short distance so that the transmission of light is possible from the chamber 80 through the bundle 118. The external light source 14 essentially lights the mixing chamber 80 through the lens plug 104. As the opaque media is dispensed, the level thereof decreases to the light transmitting section of the fiberoptic bundle 118. In the case of the slurry, a vibrator (not shown) is preferably used on the chamber 80 to minimize the film thickness of the residual slurry. The slight thickness of slurry remaining on the fiberoptic bundle 118 at the light transmitting end 118b is translucent enough so that the transmitted light is received by the photoelectric receiver 46 which in turn operates the control relay 216. The aforedescribed fiberoptic fluid level sensing mechanism is particularly useful where a mixing paddle or agitator is used since the sensor may be placed at the center of rotation thereof.

Although only one embodiment of a fiberoptic fluid level sensing mechanism constructed in accordance with the present invention has been shown in the drawings and described hereinabove, it is to be understood that modifications in the construction thereof may be made thereto by those skilled in the art without departing from the essence of the invention. In this connection, some of the modifications which can be made in the fiberoptic fluid level sensing mechanism have been alluded to hereinabove while others will become readily apparent to those skilled in the art when exposed to the present description and illustration of the construction of the fiberoptic fluid level sensing mechanism. For example, although the subject fiberoptic fluid level sensing mechanism has been depicted embodied in a particular form of mixing and dispensing device 10, it is to be understood that the invention is not limited in its application thereto but rather is capable of being employed in conjunction with various other types of process equipment utilized for dispensing or otherwise processing various fluids including liquids, slurries and powders. Moreover, it should be readily apparent that the fiberoptic fluid level sensing mechanism of the present invention is not limited in its application to use with one particular type of material, but rather is capable of being employed with any light absorbing fluid material. If so desired, the arrangement of the components which comprise the fiberoptic fluid level sensing mechanism could be inverted without departing from the essence of the present invention. Namely, the positions of the photoelectric means and the external light source could be interchanged with the light projecting means and the light transmitting means also being reversed. Another modification which could be made in the nature of the construction of the fiberoptic fluid level sensing mechanism without departing from the essence of the present invention involves constructing the fiberoptic bundle so that it includes a plurality of portions which are of varying diameter with that having the smallest diameter being located at the extreme end of the bundle and with the other portions being located so as to increase in diameter therefrom. By providing such a multiplicity of exposed portions of the bundle, it would be possible to operated the fluid level sensing mechanism as a modulated detection system. Also, if so desired, the bundle 118 could be supported within the shaft 40 so as to be movable relative thereto whereby the extent to which the end 118b of the bundle 118 projects outwardly could be varied so as to provide a fluid level sensing mechanism wherein the point at which the mechanism initiates a control function can be adjusted. Obviously, the latter could be accomplished without departing from the essence of the present invention.

Thus, it can be seen that the present invention provides a novel and improved fluid level sensing mechanism which is capable of being employed in conjunction with a variety of types of process equipment utilized for dispensing or otherwise processing various fluids incuding liquids, slurries and powders for purposes of performing a fluid level sensing function. Moreover, in accord with the present invention a fluid level sensing mechanism is provided wherein light sensing means are utilized for purposes of sensing the level of the fluid. The fluid level sensing mechanism of the present invention is provided with light sensing means which includes a fiberoptic bundle which cooperates with an external light source and photoelectric means to indicate fluid level within a confined chamber. Furthermore, in accordance with the present invention a fluid level sensing mechanism is provided which is particularly suited for use in a system wherein a slurry has been mechanically spatulated under vacuum and a controlled dispensing of this slurry takes place under air pressure. Also, a fluid level sensing mechanism has been provided in accord with the present invention which is compatible for use in a system wherein a mixing paddle or agitator is used in that the fluid level sensing function is capable of being performed notwithstanding the fact that a member is being moved within the chamber in which the fluid whose level is to be sensed is located. Finally, in accord with the present invention a fluid level sensing mechanism has been provided which is capable of accurately performing the fluid level sensing function, yet is relatively easy to employ.

Having thus described the invention, I claim:

1. In a piece of process equipment, operable for performing process operations on various fluid materials including liquids, slurries and powders, including a housing, a chamber formed in the housing, a shaft having at least a portion of the length thereof disposed in the chamber, motor means supported in the housing and operatively connected to the shaft for imparting rotation to the shaft, inlet means formed in the housing communicating with the chamber operable for supplying fluid material thereto, outlet means formed in the housing communicating with the chamber operable for dispensing fluid material therefrom, the improvement consisting of a fluid level sensing mechanism operable for sensing the level of the fluid material in the chamber, said mechanism comprising:
   a. light projecting means mounted in the housing providing communication between the exterior of the housing and the interior of the chamber, said light projecting means being positionable in juxtaposed relation to an external light source for receiving light rays therefrom and operable to direct the light rays received thereby into the interior of the housing to light the chamber provided therewithin;
   b. light transmitting means mounted within the housing and having at least a portion thereof positioned in the path of the light rays being directed into the interior of the housing through the operation of said light projecting means, said light transmitting means comprising a fiberoptic bundle supported within the shaft so as to be rotatable therewith and having one end thereof located within the chamber, said one end of said fiberoptic bundle projecting outwardly of the shaft so as to thereby be exposed, said one end of said fiberoptic bundle being struck by the light rays being directed within the chamber when the level of the fluid material therein falls to a level sufficient to render visible said one end of said fiberoptic bundle, said fiberoptic bundle during the rotation thereof being operable to transmit the light rays striking said one end thereof the length of said fiberoptic bundle;
   c. photoelectric means mounted in the housing in juxtaposed relation to the other end of said fiberoptic bundle, said photoelectric means including a photoelectric receiver located in the path of the light rays being transmitted the length of said fiberoptic bundle, said photoelectric receiver being actuated in response to being struck by light rays transmitted thereto from said fiberoptic bundle; and
   d. electrical circuit means including a control relay and operable to connect said control relay and said photoelectric receiver in circuit relation, said control relay being operated in response to actuation of said photoelectric receiver to perform a control function effecting the operation of the piece of process equipment.

2. In a piece of process equipment, the fluid level sensing mechanism as set forth in claim 1 wherein said light projecting means comprises a lens plug mounted in the housing having an acrylic window supported therein.

3. In a piece of process equipment, the fluid level sensing mechanism as set forth in claim 2 wherein the longitudinal axis of the shaft is coincident with the longitudinal axis of the housing and said lens plug is supported in the housing at an angle to the longitudinal axis of the housing so that the longitudinal axis of said lens plug and the longitudinal axis of the shaft converge towards a point whereat said one end of said fiberoptic bundle is positioned.

4. In a piece of process equipment, the fluid level sensing mechanism as set forth in claim 1 wherein said fiberoptic bundle comprises a multiplicity of fiberoptic elements encased in an outer glass cladding with the longitudinal axes thereof all aligned in substantially parallel relation relative to each other.

5. In a piece of process equipment, the fluid level sensing mechanism as set forth in claim 4 wherein a portion of said outer glass cladding is removed adjacent said one end of said fiberoptic bundle to expose to view one of the ends of each of said multiplicity of fiberoptic elements.

6. In a piece of process equipment, the fluid level sensing mechanism as set forth in claim 1 wherein said photoelectric receiver is provided with a photosensitive detector at one end thereof and electrical conductors connectable in electrical circuit relation with said electrical circuit means provided at the other end thereof, and said photoelectric means further includes a holder mounted within the housing and operable to support said photoelectric receiver thereon with said photosensitive detector thereof positioned in spaced relation to said other end of said fiberoptic bundle and with said electrical conductors of said photoelectric receiver located so as to be externally accessible.

7. A fluid level sensing mechanism operable for sensing the level of a fluid material in a container comprising:
   a. a shaft having at least a portion of the length thereof disposed in the container;
   b. motor means operatively connected to the shaft for imparting rotation to the shaft;
   c. light projecting means supported adjacent to the container to provide communication between the exterior and the interior of the container and in juxtaposed relation to an external light source for receiving light rays therefrom, said light projecting means having the longitudinal axis thereof inclined relative to the longitudinal axis of the container, and being operable to direct the light rays received thereby towards a point located within the container;
   d. light transmitting means including a fiberoptic bundle supported within said shaft so as to be rotatable therewith and having one end thereof located within the container so as to be positioned in the path of the light rays being directed therein through the operation of said light projecting means, said one end of said fiberoptic bundle being exposed so as to thereby be struck by the light rays being directed with the container when the level of the fluid material therein falls to a level sufficient to render visible said one end of said fiberoptic bundle, said fiberoptic bundle during the rotation thereof being operable to transmit the light rays striking said one end thereof the length of said fiberoptic bundle;

e. photoelectric means supported in juxtaposed relation to the other end of said fiberoptic bundle, said photoelectric means including a phototelectric receiver located in the path of the light rays being transmitted the length of said fiberoptic bundle, said photoelectric receiver being actuated in response to being struck by light rays transmitted thereto from said fiberoptic bundle; and f. electrical circuit means connected in circuit relation with said photoelectric receiver and operable when said photoelectric receiver is actuated to provide an indication that the fluid material in the container has reached a predetermined level therewithin.

8. The fluid level sensing mechanism as set forth in claim 7 wherein said light projecting means comprises a lens plug having an acrylic window supported therein.

9. The fluid level sensing mechanism as set forth in claim 7 wherein said fiberoptic bundle comprises a multiplicity of fiberoptic elements encased in an outer glass cladding with the longitudinal axes thereof all aligned in substantially parallel relation relative to each other.

10. The fluid level sensing mechanism as set forth in claim 7 wherein said photoelectric receiver is provided with a photosensitive detector at one end thereof and electrical conductors connectable in electrical circuit relation with said electrical circuit means at the other end thereof, said photoelectric means further including a holder operable to support said photoelectric receiver with said photosensitive detector thereof positioned in spaced relation to said other end of said fiberoptic bundle and with said electrical conductors located so as to be externally accessible.

* * * * *

UNITED STATES PATENT AND TRADEMARK OFFICE
CERTIFICATE OF CORRECTION

PATENT NO. : 3,995,167
DATED : November 30, 1976
INVENTOR(S) : FRANK M. KULIG

It is certified that error appears in the above-identified patent and that said Letters Patent are hereby corrected as shown below:

Column 17, line 4, "with" should be --within--.

Signed and Sealed this

Thirty-first Day of May 1977

[SEAL]

Attest:

RUTH C. MASON
*Attesting Officer*

C. MARSHALL DANN
*Commissioner of Patents and Trademarks*